(12) United States Patent
Fujihara et al.

(10) Patent No.: US 11,035,280 B2
(45) Date of Patent: Jun. 15, 2021

(54) $CO_2$ TRAPPING DEVICE

(71) Applicant: TOYOTA JIDOSHA KABUSHIKI KAISHA, Aichi-Ken (JP)

(72) Inventors: Kiyoshi Fujihara, Susono (JP); Kouseki Sugiyama, Shizuoka-ken (JP); Hiroshi Ohtsuki, Gotemba (JP); Daiki Yokoyama, Gotemba (JP); Yushi Seki, Kanagawa-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/885,281

(22) Filed: May 28, 2020

(65) Prior Publication Data

US 2020/0400058 A1 Dec. 24, 2020

(30) Foreign Application Priority Data

Jun. 21, 2019 (JP) .............................. JP2019-115871

(51) Int. Cl.
*F01N 9/00* (2006.01)
*B60K 6/24* (2007.10)
(Continued)

(52) U.S. Cl.
CPC ................ *F01N 9/002* (2013.01); *B60K 6/24* (2013.01); *B60K 6/26* (2013.01); *B60K 6/28* (2013.01);
(Continued)

(58) Field of Classification Search
CPC ... F01N 9/002; F01N 9/00; F01N 3/02; F01N 3/0857; F01N 2410/12; F01N 2240/02; F01N 2570/10; F01N 3/10; F01N 3/021; F01N 3/0835; F01N 3/2006; F01N 3/023; F01N 3/2892; F01N 2250/10; F01N 2240/36; F01N 2590/11; F01N 2900/1602; F01N 2900/104; B60K 6/24; B60K 6/26; B60K 6/28; B60L 58/12; B60L 1/00;
(Continued)

(56) References Cited

U.S. PATENT DOCUMENTS 9,581,062 B2 * 2/2017 Hamad .............. B01D 53/0462
2013/0298532 A1 11/2013 Hamad et al.

FOREIGN PATENT DOCUMENTS

JP 5760097 B2 8/2015

* cited by examiner

*Primary Examiner* — Brandon D Lee
(74) *Attorney, Agent, or Firm* — Hauptman Ham, LLP

(57) ABSTRACT

A $CO_2$ trapping device mounted in a hybrid vehicle, provided with a branch passage branched from an exhaust passage, a $CO_2$ trapping part provided at the branch passage and trapping $CO_2$ in inflowing exhaust gas, a cooling part using electric power of the battery to cool the $CO_2$ trapping part, a flow controlling part controlling an amount of flow of the exhaust gas flowing into the branch passage, and a $CO_2$ trapping control part controlling the cooling part and the flow controlling part, the $CO_2$ trapping control part controlling the flow controlling part so as to make the cooling part stop cooling and to shut off the flow of the exhaust gas to the $CO_2$ trapping part when a charging rate of the battery becomes a predetermined SOC threshold value or less.

7 Claims, 10 Drawing Sheets

(51) Int. Cl.
*B60K 6/26* (2007.10)
*B60K 6/28* (2007.10)
*F01N 3/20* (2006.01)
*B60L 58/12* (2019.01)
*B60L 1/00* (2006.01)
*F01N 3/023* (2006.01)
*F01N 3/28* (2006.01)
*F01N 3/02* (2006.01)
*F01N 3/08* (2006.01)

(52) U.S. Cl.
CPC ............... *B60L 1/00* (2013.01); *B60L 58/12* (2019.02); *F01N 3/02* (2013.01); *F01N 3/023* (2013.01); *F01N 3/0857* (2013.01); *F01N 3/2006* (2013.01); *F01N 3/2892* (2013.01); *F01N 9/00* (2013.01); *B60Y 2200/92* (2013.01); *F01N 2240/36* (2013.01); *F01N 2250/10* (2013.01); *F01N 2590/11* (2013.01); *F01N 2900/104* (2013.01); *F01N 2900/1602* (2013.01)

(58) Field of Classification Search
CPC ..... B60Y 2200/92; Y02T 10/70; Y02T 10/12; Y02A 50/20; F02D 9/04; F02D 9/08
See application file for complete search history.

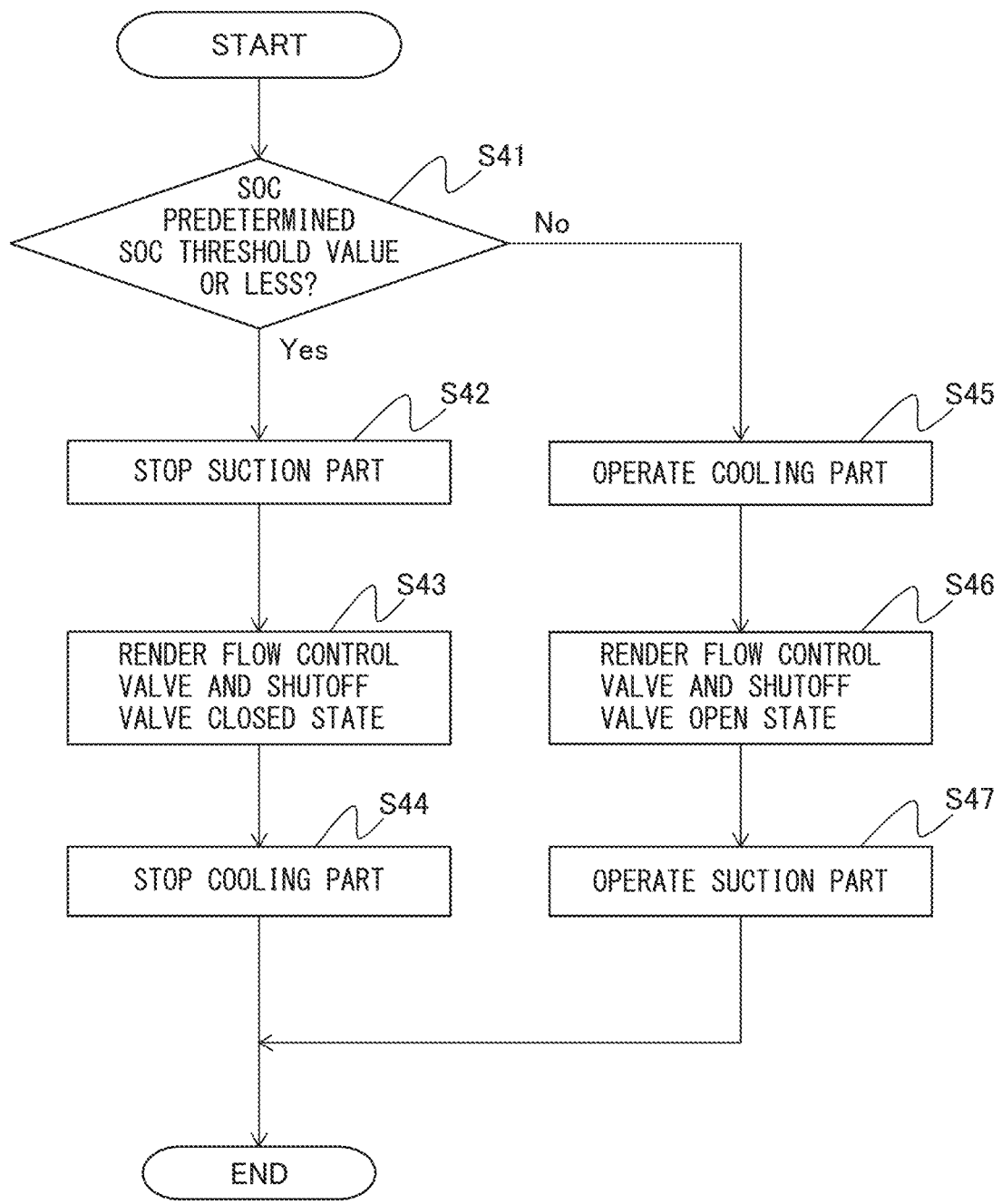

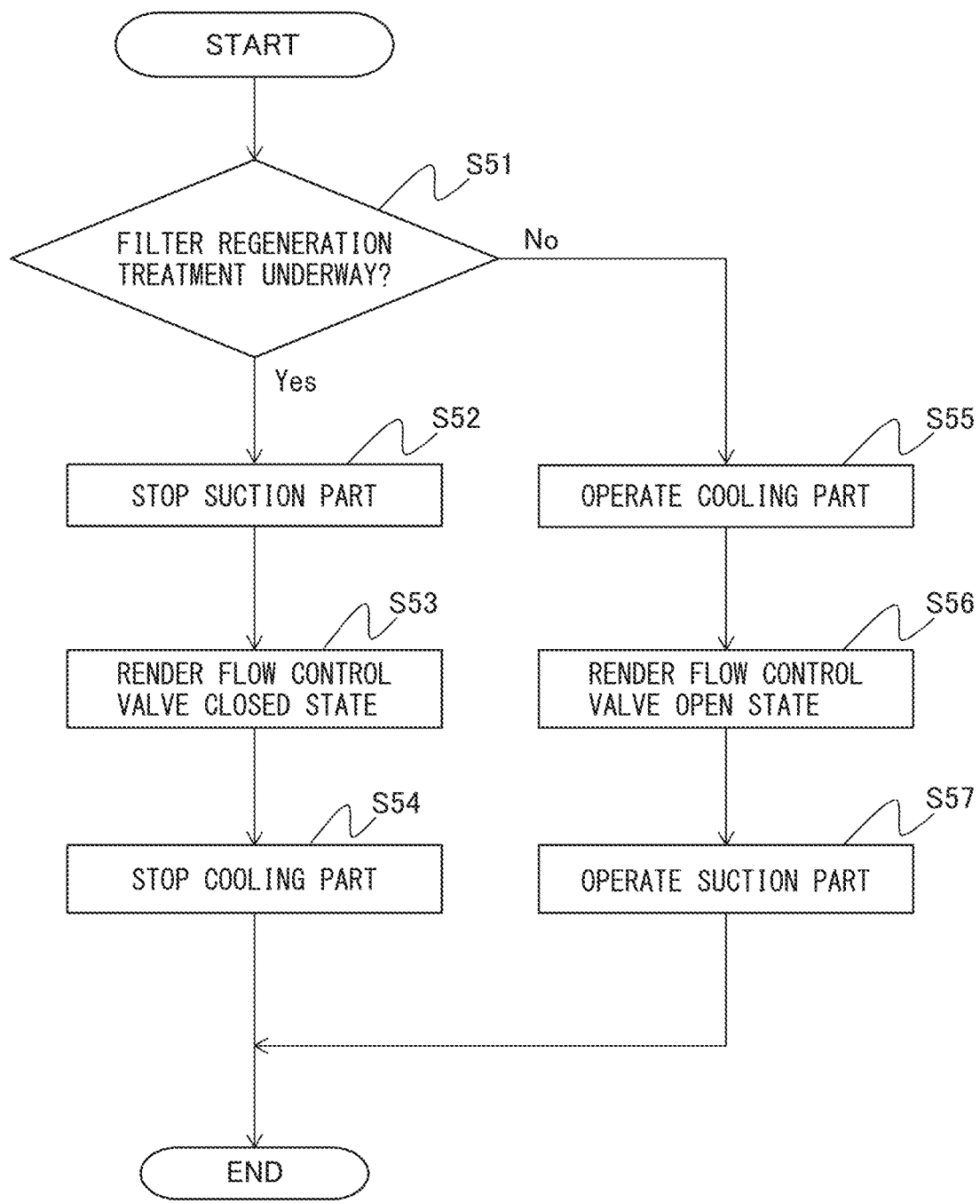

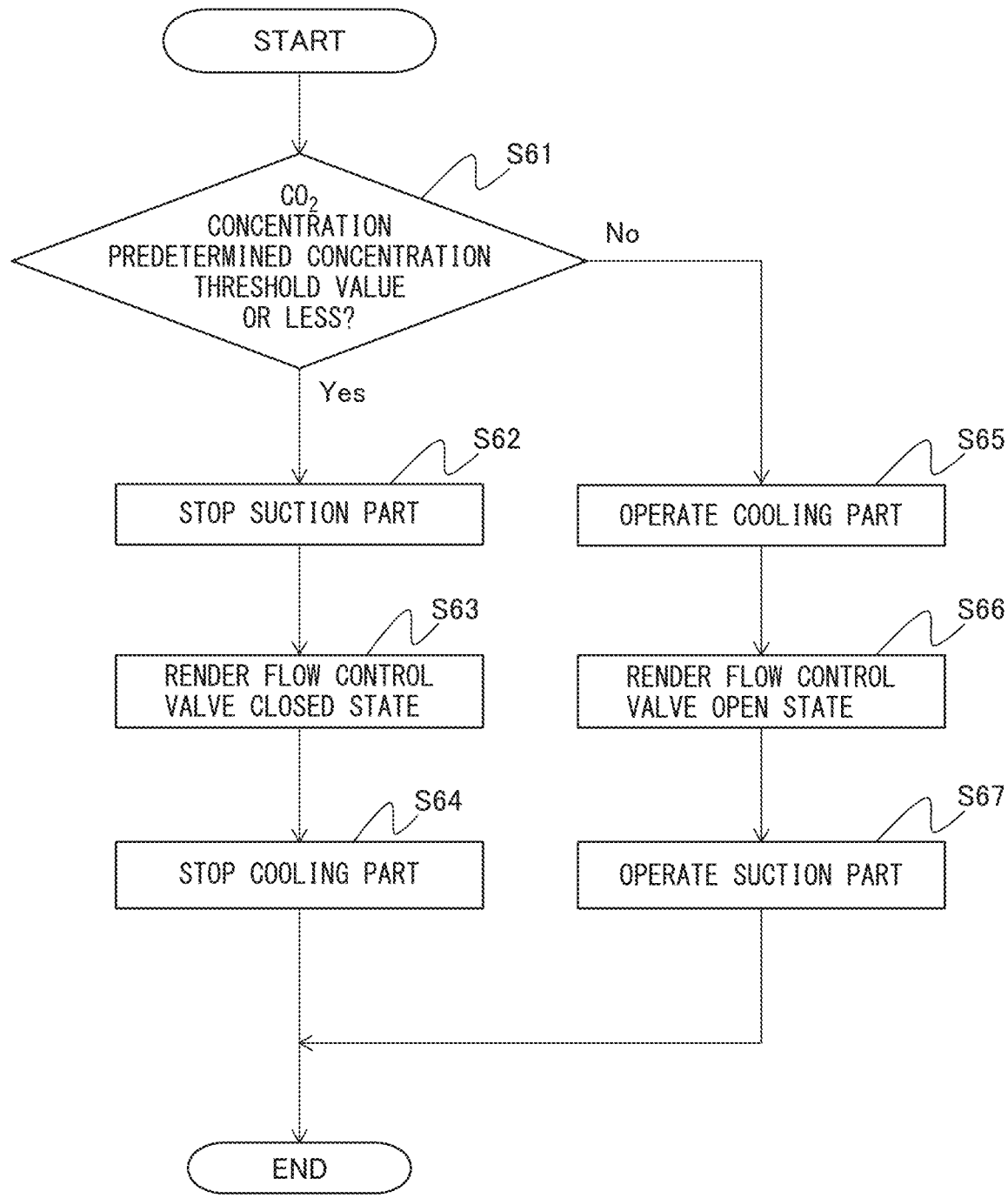

＃ $CO_2$ TRAPPING DEVICE

RELATED APPLICATIONS

The present application claims priority of Japanese Patent Application No. 2019-115871, filed Jun. 21, 2019, the disclosure of which is hereby incorporated by reference herein in its entirety.

FIELD

The present disclosure relates to a $CO_2$ trapping device.

BACKGROUND

From the viewpoint of reducing the amount of discharge of $CO_2$ from a vehicle, a $CO_2$ trapping device mounting a $CO_2$ trapping part in a vehicle has been proposed. Japanese Patent No. 5760097 discloses a conventional $CO_2$ trapping device configured to introduce exhaust gas discharged from an internal combustion engine of a vehicle to a $CO_2$ trapping part including zeolite or another $CO_2$ adsorbent to thereby trap $CO_2$ in the exhaust gas at the $CO_2$ trapping part. Due to such a configuration, this conventional $CO_2$ trapping device can cut the amount of $CO_2$ discharged from the vehicle.

At such a $CO_2$ trapping device, the $CO_2$ trapping part is cooled to optimize the $CO_2$ trapping ability at the $CO_2$ trapping part.

SUMMARY

In this regard, such a $CO_2$ trapping part is envisioned as being applied to an HV (hybrid vehicle), PHV (plug-in hybrid vehicle), etc. in the future. However, when applying a $CO_2$ trapping part to such a vehicle, in addition to the electric power etc. to be supplied to the electric motor for imparting drive power to the vehicle, electric power for cooling the $CO_2$ trapping part is consumed at the battery. For this reason, in this case, the amount of consumption of electric power by the battery increases and charging rate of the battery easily becomes smaller. As a result, a shortage of the electric power required for driving easily arises.

In consideration of the above problem, an object of the present disclosure is to keep the trapping ability of $CO_2$ at the $CO_2$ trapping part from falling while keeping a shortage of the electric power required for driving from arising.

The gist of the present disclosure is as follows:

(1) A $CO_2$ trapping device mounted in a hybrid vehicle, the hybrid vehicle comprising:
an internal combustion engine and electric motor as sources of power; and
a battery supplying electric power to the electric motor and able to be charged by output of the internal combustion engine, wherein
the $CO_2$ trapping device comprises;
a branch passage branched from an exhaust passage through which exhaust gas discharged from the internal combustion engine is made to flow;
a $CO_2$ trapping part provided at the branch passage and trapping $CO_2$ in inflowing exhaust gas;
a cooling part using electric power of the battery to cool the $CO_2$ trapping part;
a flow controlling part controlling an amount of flow of the exhaust gas flowing into the branch passage; and
the $CO_2$ trapping control part configured so as to control the cooling part and the flow controlling part, and
the $CO_2$ trapping control part is configured to control the flow controlling part so as to make the cooling part stop cooling and to shut off the flow of the exhaust gas to the $CO_2$ trapping part when a charging rate of the battery becomes less than or equal to a predetermined SOC threshold value.

(2) The $CO_2$ trapping device according to (1), wherein
the internal combustion engine comprises a particulate filter provided at an upstream side from the $CO_2$ trapping device in a direction of flow of exhaust gas in the exhaust passage and trapping particulate matter in the exhaust gas, and
the $CO_2$ trapping control part is further configured to control the flow controlling part so as to make the cooling part stop cooling and to shut off the flow of the exhaust gas to the $CO_2$ trapping part when filter regeneration processing is performed holding a temperature of the particulate filter at a filter regeneration temperature.

(3) The $CO_2$ trapping device according to claim (1) or (2), wherein
the $CO_2$ trapping control part is further configured to control the flow controlling part so as to make the cooling part stop cooling and to shut off the flow of the exhaust gas to the $CO_2$ trapping part when a concentration of $CO_2$ in the exhaust gas is less than or equal to a predetermined concentration threshold value.

(4) The $CO_2$ trapping device according to any one of (1) to (3), wherein
the branch passage is connected so as to merge with the exhaust passage at a downstream side from the $CO_2$ trapping part in a direction of flow of exhaust gas,
the $CO_2$ trapping device further includes a shutoff valve provided in the branch passage between a merging position with the exhaust passage and the $CO_2$ trapping part, and
the $CO_2$ trapping control part is further configured to control the shutoff valve so as to render the shutoff valve a closed state when the charging rate of the battery becomes less than or equal to a predetermined SOC threshold value.

(5) The $CO_2$ trapping device according to any one of claims (1) to (4), wherein
the $CO_2$ trapping control part is further configured to control the flow controlling part so as to shut off the flow of the exhaust gas to the $CO_2$ trapping part, and configured to then stop cooling by the cooling part.

(6) The $CO_2$ trapping device according to any one of claims (1) to (5) wherein
the $CO_2$ trapping device comprises a suction part using electric power of the battery to suck in the exhaust gas from the exhaust passage and making the sucked in exhaust gas flow into the branch passage, and
the $CO_2$ trapping control part is further configured to make suction by the suction part stop when the charging rate of the battery becomes less than or equal to a predetermined SOC threshold value.

(7) The $CO_2$ trapping device according to claim (6), wherein
the $CO_2$ trapping control part is configured to control the flow controlling part so as to stop the suction part, then shut off the flow of the exhaust gas to the $CO_2$ trapping part.

According to the present disclosure, it becomes possible to keep the trapping ability of $CO_2$ at the $CO_2$ trapping part from falling while keeping a shortage of the electric power required for driving from arising.

BRIEF DESCRIPTION OF DRAWINGS

FIG. 8 is a flow chart showing a control routine performed at the $CO_2$ trapping control part.

FIG. 9 is a flow chart showing a control routine performed at the $CO_2$ trapping control part.

FIG. 10 is a flow chart showing a control routine performed at the $CO_2$ trapping control part.

DESCRIPTION OF EMBODIMENTS

Figure 1:
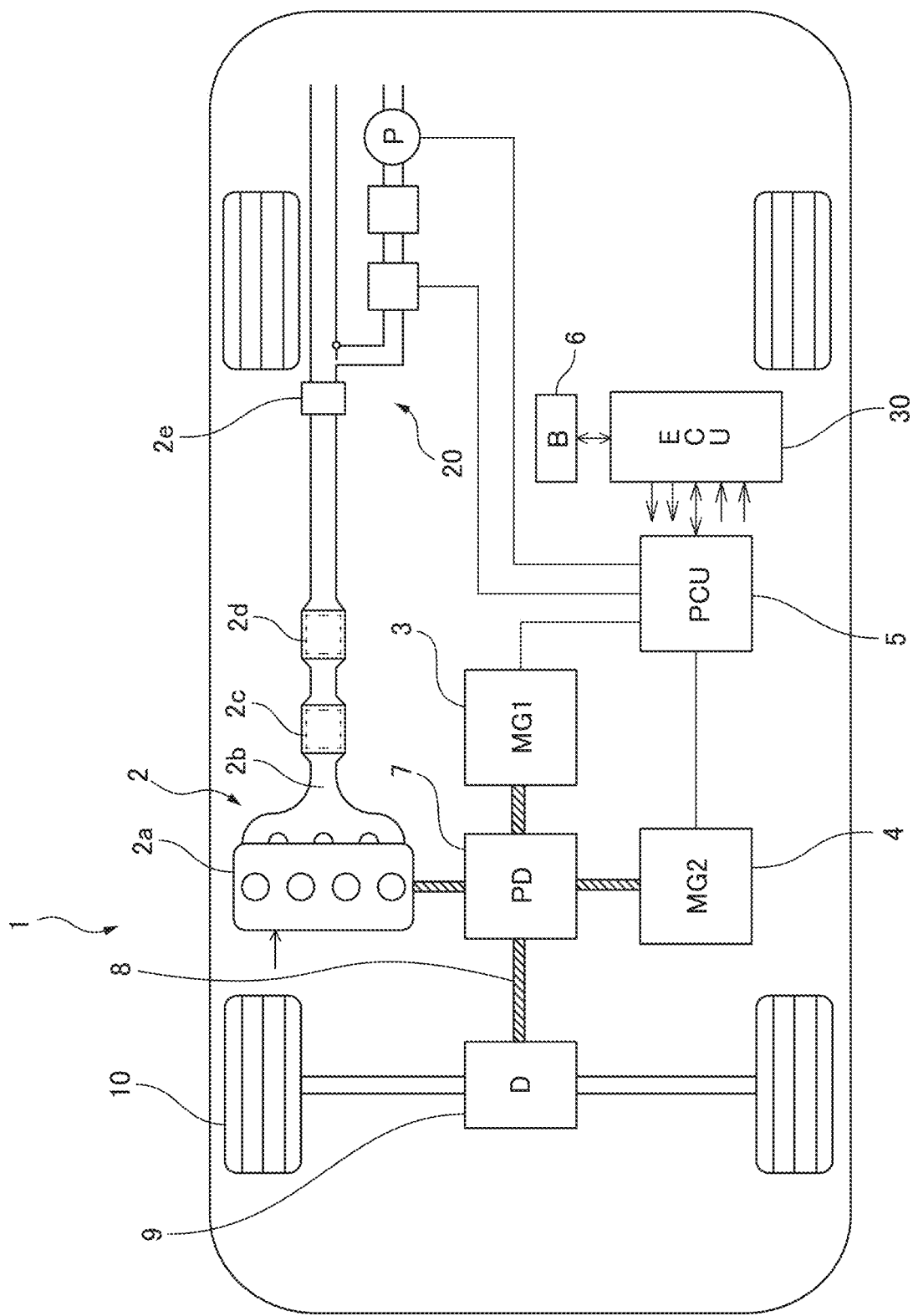
FIG. 1 is a view schematically showing the configuration of a hybrid vehicle.

Below, referring to the drawings, embodiments of the present disclosure are explained in detail. Note that, in the following explanation, similar components are assigned the same reference notations.

First Embodiment

Configuration of Hybrid Vehicle

FIG. 1 is a view schematically showing the configuration of a hybrid vehicle 1 according to the present embodiment. As shown in FIG. 1, the hybrid vehicle 1 (below, also referred to as the "vehicle 1") is provided with an internal combustion engine 2, first motor-generator 3, second motor-generator 4, power control unit (PCU) 5, battery 6, $CO_2$ trapping device 20, and electronic control unit (ECU) 30.

The internal combustion engine 2 is a prime mover making fuel such as gasoline or diesel oil burn inside an engine and convert the heat energy of combustion gas to mechanical energy and functions as a source of drive power of the vehicle 1. The output of the internal combustion engine 2 is controlled by adjusting the amount of fuel or air supplied to the internal combustion engine 2. An output shaft (crank shaft) of the internal combustion engine 2 is mechanically connected to a power division mechanism 7. The output of the internal combustion engine 2 is input to the power division mechanism 7.

The first motor-generator 3 and second motor-generator 4 are respectively mechanically connected to the power division mechanism 7 at the input-output shafts and are electrically connected to the PCU 5. The first motor-generator 3 and second motor-generator 4 are configured to function as motors of the vehicle 1. Further, the first motor-generator 3 and second motor-generator 4 are configured to function as generators.

The power division mechanism 7 is mechanically connected to the internal combustion engine 2, first motor-generator 3, and second motor-generator 4. In addition, the power division mechanism 7 is connected to a drive shaft 8. The drive shaft 8 is connected through a differential gear 9 to the wheels 10.

The power division mechanism 7 is configured to be able to output drive power input from any one of the internal combustion engine 2, first motor-generator 3, second motor-generator 4, and drive shaft 8 connected to the power division mechanism 7 to at least one component among these.

The PCU 5 is provided with an inverter or DCDC converter etc. As shown in FIG. 1, the PCU 5 is electrically connected to the first motor-generator 3, second motor-generator 4, battery 6, and $CO_2$ trapping device 20. The PCU 5 performs control of the first motor-generator 3, second motor-generator 4, battery 6, and $CO_2$ trapping device 20, converts electric power supplied from the battery 6 to the first motor-generator 3, second motor-generator 4, and $CO_2$ trapping device 20, and converts electric power supplied from the first motor-generator 3 and second motor-generator 4 to the battery 6.

The battery 6 is electrically connected to the PCU 5 and stores power. The battery 6 supplies electric power to the first motor-generator 3, second motor-generator 4, and/or $CO_2$ trapping device 20. Further, the battery 6 is configured to be able to be charged by the output of the internal combustion engine 2. Specifically, if the first motor-generator 3 or second motor-generator 4 is driven by drive power input through the power division mechanism 7 by output of the internal combustion engine 2, the battery 6 is charged through the PCU 5. On the other hand, when the first motor-generator 3 or second motor-generator 4 outputs drive power to the power division mechanism 7, electric power is supplied from the battery 6 through the PCU 5 to the first motor-generator 3 or second motor-generator 4.

The $CO_2$ trapping device 20 traps the $CO_2$ in the exhaust gas discharged from the internal combustion engine 2. Details of the $CO_2$ trapping device 20 will be explained later using FIG. 2.

The ECU 30 is configured by a digital computer and is provided with components connected with each other through a bidirectional bus such as a RAM (random access memory), ROM (read only memory), or other memory, CPU (microprocessor), input port, and output port. The input port and output port of the ECU 30 are connected to the various actuators or various sensors of the internal combustion engine 2, PCU 5, battery 6, etc. At the input port of the ECU 30, output signals of the various sensors, PCU 5, and battery 6 of the internal combustion engine 2 are input. In addition, the output port of the ECU 30 outputs control signals to the various actuators, PCU 5, battery 6, and $CO_2$ trapping device 20 of the internal combustion engine 2. Therefore, the various actuators, PCU 5, battery 6, and $CO_2$ trapping device 20 of the internal combustion engine 2 are controlled by the ECU 30.

In the thus configured vehicle 1, if part or all of the drive power obtained by the internal combustion engine 2 is input to the first motor-generator 3 or second motor-generator 4, it is possible to generate power by the first motor-generator 3 or second motor-generator 4. The electric power obtained by this power generation is charged at the battery 6 through the PCU 5 or is supplied to the motor-generator not generating power among the first motor-generator 3 and second motor-generator 4. Therefore, the vehicle 1 is configured to be able to charge the electric power generated by output of the internal combustion engine 2 at the battery 6. Further, if part or all of the drive power obtained by the internal combustion engine 2 is input to the drive shaft 8, the wheels 10 can be turned by this drive power.

Further, the vehicle 1 is configured to be able to drive the first motor-generator 3 or second motor-generator 4 by the electric power supplied from the battery 6. The drive power obtained by driving the first motor-generator 3 or second motor-generator 4 can be input to the internal combustion engine 2. Therefore, the internal combustion engine 2 stopping due to this drive power is made to start. Further, if the drive power obtained by driving the first motor-generator 3 or second motor-generator 4 is input to the drive shaft 8, the wheels 10 can rotate due to this drive power.

Note that, in the present embodiment, the vehicle 1 is provided with two motor-generators by the first motor-generator 3 and the second motor-generator 4. However, the vehicle 1 does not necessarily have to be provided with two motor-generators. It may also have a single motor-generator.

Configuration of Internal Combustion Engine and $CO_2$ Trapping Device

Figure 2:
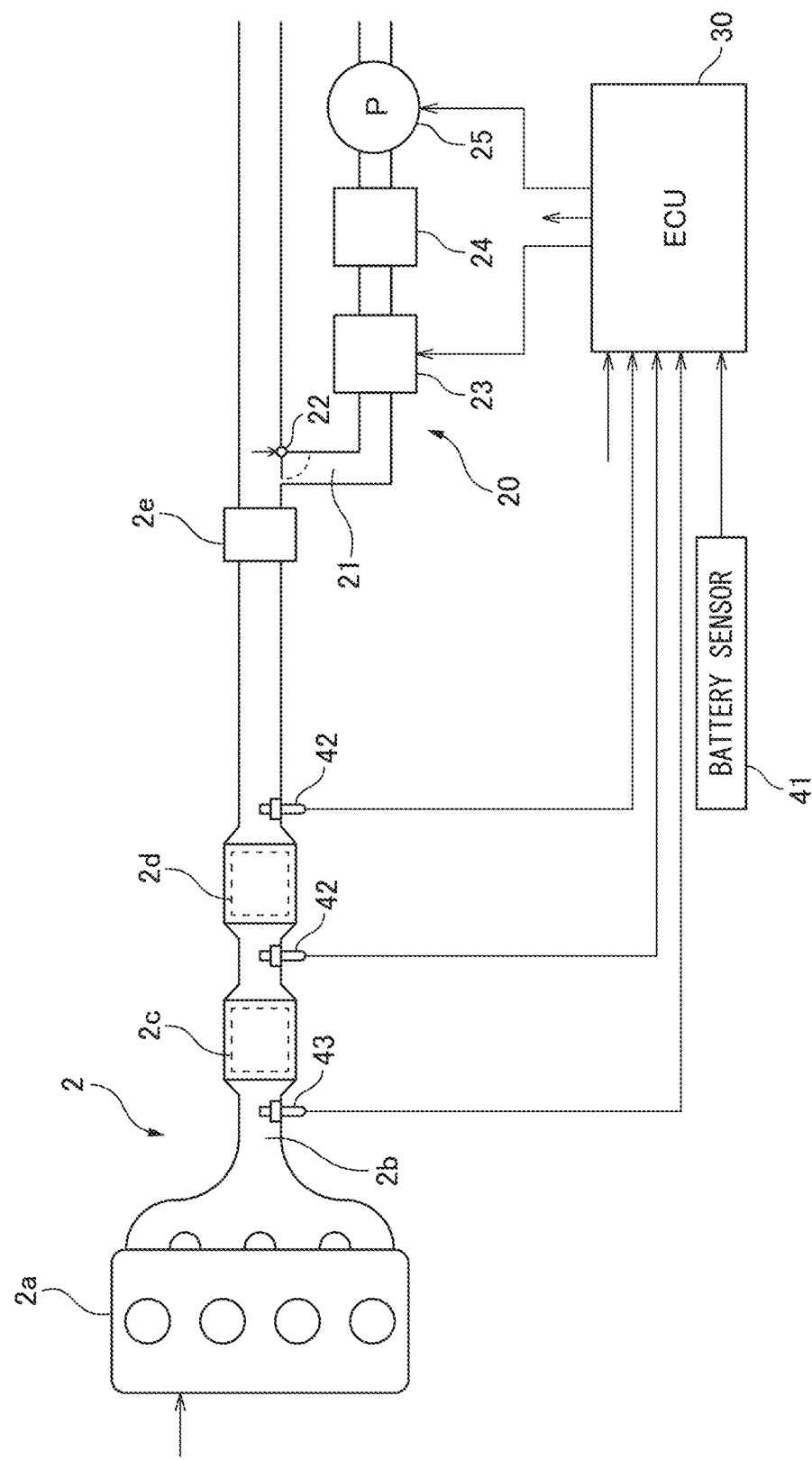
FIG. 2 is a view showing the configurations of an internal combustion engine and $CO_2$ trapping device.

FIG. 2 will be used to explain the configurations of the internal combustion engine and $CO_2$ trapping device according to the present embodiment. FIG. 2 is a view schematically showing the configurations of the internal combustion engine 2 and $CO_2$ trapping device 20 according to the present embodiment. FIG. 2 shows the internal combustion engine 2 and $CO_2$ trapping device 20.

As shown in FIG. 2, the internal combustion engine 2 is provided with an engine body 2a, an exhaust passage 2b through which exhaust gas discharged from the engine body 2a of the internal combustion engine 2 flows, an exhaust purification catalyst 2c, particulate filter 2d, and a muffler 2e.

The exhaust purification catalyst 2c removes the NOx, HC (hydrocarbons), CO, and other substances in the exhaust gas flowing into the exhaust purification catalyst 2c. The exhaust purification catalyst 2c is, for example, a three-way catalyst, NOx storage reduction catalyst, selective catalytic reduction type NOx reduction catalyst (SCR catalyst) etc. The exhaust purification catalyst 2c is housed in a casing and is provided in the exhaust passage 2b.

The particulate filter 2d traps the particulate matter (PM) in the exhaust gas. The particulate filter 2d is housed in the casing and is provided in the exhaust passage 2b at the downstream side from the exhaust purification catalyst 2c in the direction of flow of exhaust gas.

The muffler 2e lowers the temperature and pressure of the exhaust gas flowing through the inside of the exhaust passage 2b to decrease the exhaust noise. The muffler 2e is provided in the exhaust passage 2b at the downstream side from the particulate filter 2d in the direction of flow of exhaust gas. Note that, a plurality of mufflers 2e may also be provided at the exhaust passage 2b.

As shown in FIG. 2, the $CO_2$ trapping device 20 is provided with a branch passage 21 branched from the exhaust passage 2b of the internal combustion engine 2, a flow control valve 22, a cooling part 23, a $CO_2$ trapping part 24, and a suction part 25. The flow control valve 22, cooling part 23, $CO_2$ trapping part 24, and suction part 25 are provided in that order in the branch passage 21 from the upstream side in the direction of flow of exhaust gas. In the present embodiment, the branch passage 21 is connected with the atmosphere so as to discharge the exhaust gas flowing through the branch passage 21 directly into the atmosphere.

The flow control valve 22 is provided at the end of the branch passage 21 at the upstream side in the direction of flow of exhaust gas. The flow control valve 22 functions as a flow controlling part controlling the amount of flow of exhaust gas flowing from the exhaust passage 2b into the branch passage 21. In the present embodiment, the flow control valve 22, for example, can be made a shutoff valve switched between an open state and a closed state. Note that, the flow control valve 22 may also be a valve able to be adjusted in opening degree. Further, in the present embodiment, the flow control valve 22 is provided at the end of the branch passage 21 at the upstream side in the direction of flow of exhaust gas, but the invention is not limited to this.

It is sufficient that this be provided at the branch passage 21 at the upstream side from the $CO_2$ trapping part 24 in the direction of flow of exhaust.

The cooling part 23 is configured so as to use the electric power of the battery 6 to cool the $CO_2$ trapping part 24. Specifically, the cooling part 23 is configured to use the electric power of the battery 6 to cool the inflowing exhaust gas down to the targeted cooling temperature and make the cooled exhaust gas flow into the $CO_2$ trapping part 24. The cooling part 23 is, for example, configured as a refrigeration circuit provided with a compressor, condenser, expansion valve, and evaporator. At the cooling part 23, the refrigeration cycle is realized by refrigerant circulating through these components. In particular, the evaporator exchanges heat with the exhaust gas flowing through the exhaust passage 2b directly or indirectly through a medium and cools this exhaust gas. The refrigerant in the refrigeration circuit falls to a temperature lower than the temperature of the atmosphere, so in the present embodiment, the cooling part 23 can lower the temperature of the exhaust gas flowing into the $CO_2$ trapping part 24 down to a temperature lower than the temperature of the atmosphere (ordinary temperature).

Note that, in the present embodiment, the cooling part 23 is provided at the branch passage 21, but the invention is not limited to this. It is sufficient to provide the cooling part 23 at the exhaust passage 2b at the upstream side from the $CO_2$ trapping part 24 in the direction of flow of exhaust so as to enable the exhaust gas cooled by it to flow into the $CO_2$ trapping part 24. Further, in the present embodiment, the cooling part 23 is configured so as to cool the exhaust gas so as to cool the $CO_2$ trapping part 24, but the invention is not limited to this. For example, it may also be configured so as to exchange heat between the refrigerant and later explained $CO_2$ adsorbent of the $CO_2$ trapping part 24 to thereby directly cool the trapping part 24.

The $CO_2$ trapping part 24 is configured to trap the $CO_2$ in the inflowing exhaust gas. In the present embodiment, the $CO_2$ trapping part 24 is arranged inside a luggage space positioned at a rear of the vehicle 1 or below it. Note that, the $CO_2$ trapping part 24 is a heavy object, so inside the luggage space, it is preferably arranged at the bottom side in the vertical direction as much as possible.

As the method of trapping the $CO_2$ in the exhaust gas by the $CO_2$ trapping part 24, for example, a physical adsorption method, physical absorption method, chemical absorption method, cryogenic separation method, etc. may be mentioned.

The physical adsorption method is the method of for example bringing activated carbon or zeolite or another solid adsorbent into contact with the exhaust to thereby make the $CO_2$ be adsorbed at the solid adsorbent and of heating this (or reducing the pressure of this) so as to make the $CO_2$ desorb from the solid adsorbent for recovery.

When employing the physical adsorption method, the $CO_2$ trapping part 24 is, for example, configured as a container holding pellet shaped zeolite. By making the gas containing $CO_2$ run through the inside of this container, the $CO_2$ is made to be adsorbed at the zeolite.

The physical absorption method is the method of bringing an absorption solution able to dissolve $CO_2$ (for example, methanol or N-methyl pyrrolidone) into contact with the gas containing $CO_2$ to physically make the $CO_2$ be absorbed by the absorption solution at a high pressure and low temperature and of heating this (or reducing the pressure of this) so as to recover the $CO_2$ from the absorption solution.

When employing the physical absorption method, the $CO_2$ trapping part 24 is, for example, configure as a container holding methanol. By running the gas containing $CO_2$ in the methanol contained in this container, $CO_2$ is absorbed at the methanol.

The chemical absorption method is the method of bringing an absorption solution able to selectively dissolve $CO_2$ (for example, an amine or potassium carbonate aqueous solution) into contact with the gas containing $CO_2$ to make the $CO_2$ be absorbed by the absorption solution by a chemical reaction and of heating this so as to make the $CO_2$ disassociate from the absorption solution for recovery.

If employing the chemical absorption method, the $CO_2$ trapping part 24 is, for example, configured as a container containing amine. By running the gas containing $CO_2$ in the methanol contained in this container, $CO_2$ is absorbed at the methanol.

In the $CO_2$ trapping part 24 according to the present embodiment, the physical adsorption method is employed as the method of trapping $CO_2$ in the exhaust. Therefore, the $CO_2$ trapping part 24 is configured as a container containing pellet shaped zeolite.

As shown in FIG. 2, the $CO_2$ trapping part 24 is provided at the downstream side from the muffler 2e in the direction of flow of exhaust gas. Therefore, exhaust gas with a relatively low temperature flows into the $CO_2$ trapping part 24. Further, as shown in FIG. 2, the $CO_2$ trapping part 24 is provided at the downstream side from the exhaust purification catalyst 2c and particulate filter 2d in the direction of flow of exhaust gas. Therefore, exhaust gas after the HC, NOx, PM, etc. have been substantially removed by the exhaust purification catalyst 2c and particulate filter 2d flows into the $CO_2$ trapping part 24.

The suction part 25 is configured to use the electric power of the battery 6 to suck exhaust gas from the exhaust passage 2b and make the sucked exhaust gas flow to the branch passage 21. In the present embodiment, the suction part 25 can, for example, be made an electric powered pump configured so as to be able to be changed seamlessly in discharge capacity by adjustment of the electric power supplied from the battery 6.

As shown in FIG. 2, the ECU 30 has various types of sensors connected to it. Specifically, the ECU 30 has a battery sensor 41, differential pressure sensors 42, and air-fuel ratio sensor 43 connected to it. At the input port of the ECU 30, output values of the battery sensor 41, differential pressure sensors 42, and air-fuel ratio sensor 43 are input.

The battery sensor 41 detects the SOC of the battery 6 (charging rate). The differential pressure sensors 42 are provided before and after the particulate filter 2d and detects the pressure difference between the upstream side and downstream side of the particulate filter 2d in the direction of flow of exhaust. The air-fuel ratio sensor 43 detects the air-fuel ratio of the exhaust gas flowing through the inside of the exhaust passage 2b.

Figure 3:
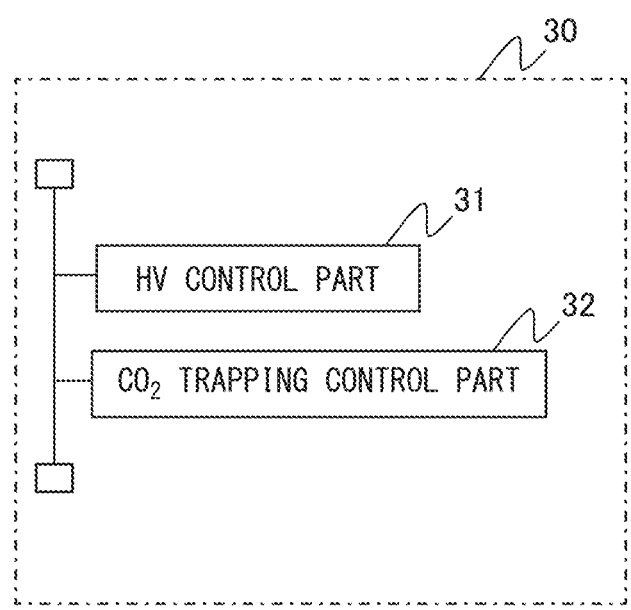
FIG. 3 is a functional block diagram of a CPU of an ECU.

Functional Modules of ECU FIG. 3 is a functional block diagram of the CPU of the ECU 30. As shown in FIG. 3, in the present embodiment, the CPU of the ECU 30 is provided with functional modules of the HV control part 31 and $CO_2$ trapping control part 32. In the present embodiment, the ECU 30 runs programs etc. stored in the memory and functions as the HV control part 31 and $CO_2$ trapping control part 32.

The HV control part 31 performs overall control of the hybrid vehicle 1. For example, the HV control part 31 sets in advance the driving mode when the vehicle 1 is being driven and the targeted SOC of the battery 6. Further, the HV control part 31 selects as the driving mode the EV (electric vehicle) mode or HV (hybrid vehicle) mode and controls the outputs of the internal combustion engine 2, first motor-generator 3, and second motor-generator 4 based on the driving mode.

The $CO_2$ trapping control part 32 performs the overall control in the $CO_2$ trapping device 20. For example, the $CO_2$ trapping control part 32 controls the operation of the flow control valve 22, the cooling temperature and stopping of cooling of the cooling part 23, the discharge capacity and stopping of suction at the suction part 25, etc.

Summary of Control at Hybrid Vehicle

Below, a summary of control at the hybrid vehicle 1 according to the present embodiment will be explained.

In the EV mode, the internal combustion engine 2 is stopped and the drive power for driving use by only the motor-generators 3, 4 is output. For this reason, at the EV mode, electric power is supplied from the battery 6 to the motor-generators 3, 4. As a result, in the EV mode, the amount of electric power of the battery 6 decreases and the SOC of the battery 6 falls. Note that, a one-way clutch transmitting rotational force in one direction is provided at the power division mechanism 7. In the EV mode, drive power for driving use may also be output by the first motor-generator 3 and second motor-generator 4.

On the other hand, in the HV mode, drive power for driving use is output by the internal combustion engine 2 and the motor-generators 3, 4. In the HV mode, basically, the electric power generated by the first motor-generator 3 using the output of the internal combustion engine 2 is supplied to the second motor-generator 4 and the supply of electric power from the battery 6 is stopped. For example, the HV control part 31 performs basic HV control in the HV mode using the drive power of the internal combustion engine 2 for driving use, using part of the drive power to drive regenerative operation of the first motor-generator 3, using the generated electric power to drive the second motor-generator 4, and using the obtained drive power of the second motor-generator 4 as drive power for driving use. Further, the HV control part 31 performs control so that when, for example, the amount of depression of the accelerator pedal increases, it drives the second motor-generator 4 by generated electric power of the first motor-generator 3 and the charged electric power of the battery 6 so as to secure the driving performance of the vehicle 1 and uses the drive powers of both of the internal combustion engine 2 and second motor-generator 4 as drive power for driving use.

Further, the HV control part 31 can perform charging control in the HV mode where it uses the output of the internal combustion engine 2 to charge the battery 6. For example, the HV control part 31 performs priority charging control where, when the SOC of the battery 6 becomes a predetermined lower limit value (for example, an SOC of 14% etc.) or less, as charging control, it operates the internal combustion engine 2 near the optimal operating point, uses the drive power of the internal combustion engine 2 minus the drive power used for driving to generate electric power by the first motor-generator 3, and supplies the generated electric power to the battery 6 to thereby charge the battery 6 on a priority basis from the time of normal driving. As a result, the battery 6 is quickly charged. This priority charging control is, for example, performed until the SOC of the battery 6 rises to a predetermined lower limit value (for example, an SOC of 14% etc.)

Note that, in the present embodiment, the HV control part 31 performs priority charging control as the charging control in the HV mode, but may also perform other charging control. For example, the HV control part 31 performs compulsory charging control of the battery 5 where, when the SOC of the battery 6 becomes a predetermined lower limit value (for example an SOC of 8% etc.) or less, even if the internal combustion engine 2 cannot be driven at the optimal operating point, it compulsorily starts the internal combustion engine 2 to supply the electric power generated by the first motor-generator 3 to the battery 6. As a result, even if the drive power response is sacrificed somewhat, the battery 6 can be quickly charged. Such compulsory charging control is, for example, performed until the SOC of the battery 6 rises to a predetermined lower limit value (for example an SOC of 8% etc.)

In the HV mode, fuel is consumed at the internal combustion engine 2, while in the EV mode, fuel is not consumed at the internal combustion engine 2. For this reason, to improve the fuel efficiency of the vehicle 1, it is desirable to maintain the driving mode as much as possible at the EV mode.

The heat efficiency of the internal combustion engine 2 normally becomes low when the engine load is low. For this reason, on a stretch where the driving load is low, for example, a stretch with a large number of traffic lights, a stretch which easily becomes congested, etc., the HV control part 31 preferably sets the driving mode to the EV mode to make the internal combustion engine 2 stop. On the other hand, on a stretch where the driving load is high, for example, a highway, upward grade, etc., the HV control part 31 preferably sets the driving mode to the HV mode.

Summary of Method of Trapping $CO_2$

Below, the method of trapping $CO_2$ at the $CO_2$ trapping part 24 will be explained. At the above-mentioned $CO_2$ trapping device 20, when the flow control valve 22 is controlled to the open state and the suction part 25 is operating, part of the exhaust gas flowing through the exhaust passage 2b and reaching the branched position with the branch passage 21 flows through the branch passage 21. Note that, when the flow control valve 22 is set to the open state, even if the suction part 25 is not operated, if small in amount, the exhaust gas flows through the branch passage 21.

On the other hand, when the flow control valve 22 is controlled to the closed state, the inflow of exhaust gas from the exhaust passage 2b to the branch passage 21 is shut off. As a result, the inflow of exhaust gas to the $CO_2$ trapping part 24 is shut off.

Further, when the exhaust gas discharged from the internal combustion engine 2 is a high temperature, the cooling part 23 is operated, whereby before the exhaust gas flows into the $CO_2$ trapping part 24 at the branch passage 21, it is cooled to the targeted cooling temperature at the cooling part 23. For example, when, like in the present embodiment, zeolite is used as the $CO_2$ adsorbent of the $CO_2$ trapping part 24, the exhaust gas flowing through the branch passage 21 is cooled at the cooling part 23 to a cooling temperature of ordinary temperature (for example, 30° C. or so) or less so as to optimize the trapping ability of $CO_2$ of the zeolite at the $CO_2$ trapping part 24. For this reason, low temperature exhaust gas is made to flow to the $CO_2$ trapping part 24.

If the exhaust gas cooled at the cooling part 23 flows through the branch passage 21 to the $CO_2$ trapping part 24, the $CO_2$ adsorbent of the $CO_2$ trapping part 24 and the inflowing exhaust gas contact. As a result, $CO_2$ is removed by adsorption from the exhaust gas by the $CO_2$ trapping part 24.

After that, for example, a dedicated $CO_2$ recovery facility heats (or reduces the pressure) of the $CO_2$ adsorbent of the $CO_2$ trapping part 24 to make the $CO_2$ desorb from the $CO_2$ trapping part 24 whereby the $CO_2$ is collected.

Control of $CO_2$ Trapping Device and Action and Effect of Same

In this regard, as explained above, the exhaust gas discharged from the internal combustion engine 2 is high in temperature. If the zeolite becomes high in temperature, the adsorbed $CO_2$ is made to desorb. Therefore, if the high temperature exhaust gas flows as is into the $CO_2$ trapping part 24, the $CO_2$ trapping part 24 becomes high in temperature, the trapping ability of $CO_2$ at the $CO_2$ trapping part 24 falls, and the trapped $CO_2$ ends up desorbing from the $CO_2$ trapping part 24.

As opposed to this, in the present embodiment, when making exhaust gas flow into the $CO_2$ trapping part 24 through the branch passage 21, the cooling part 23 is made to operate. Due to this, the exhaust gas is cooled before flowing into the $CO_2$ trapping part 24 and the $CO_2$ trapping part 24 is kept from becoming high in temperature. As a result, the trapping ability of $CO_2$ at the $CO_2$ trapping part 24 is kept from falling and in turn the trapped $CO_2$ is kept from ending up desorbing from the $CO_2$ trapping part 24.

On the other hand, if the hybrid vehicle 1 has such a $CO_2$ trapping device 20, in addition to the electric power for driving the motor-generators 3, 4 etc., the electric power for the cooling part 23 to cool the $CO_2$ trapping part 24 is consumed by the battery 6, so the amount of power consumption at the battery 6 increases. For this reason, if the SOC of the battery 6 is small in the hybrid vehicle 1, if continuing the cooling by this cooling part 23, a shortage of the electric power required for driving more easily occurs.

Therefore, in the present embodiment, the $CO_2$ trapping control part 32 stops the cooling by the cooling part 23 when the SOC of the battery 6 becomes a predetermined SOC threshold value or less. As a result, the electric power for the cooling part 23 to cool the $CO_2$ trapping part 24 is cut. For this reason, a shortage of the electric power required for driving can be kept from occurring.

On the other hand, if stopping cooling by the cooling part 23, the high temperature exhaust gas flows into the $CO_2$ trapping part 24 and the $CO_2$ trapping part 24 ends up becoming high in temperature. As a result, the trapping ability of $CO_2$ at the $CO_2$ trapping part 24 falls.

Therefore, in the present embodiment, the $CO_2$ trapping control part 32 stops the cooling by the cooling part 23 and controls the flow control valve 22 so as to shut off the flow of the exhaust gas to the $CO_2$ trapping part 24 when the SOC of the battery 6 becomes a predetermined SOC threshold value or less. As a result, even when stopping the cooling by the cooling part 23, the high temperature exhaust gas is kept from flowing into the $CO_2$ trapping part 24 and the $CO_2$ trapping part 24 from ending up becoming high in temperature. For this reason, according to the present embodiment, the trapping ability of $CO_2$ at the $CO_2$ trapping part 24 is kept from dropping while a shortage of the electric power required for driving can be kept from occurring.

Flow Chart

Figure 4:
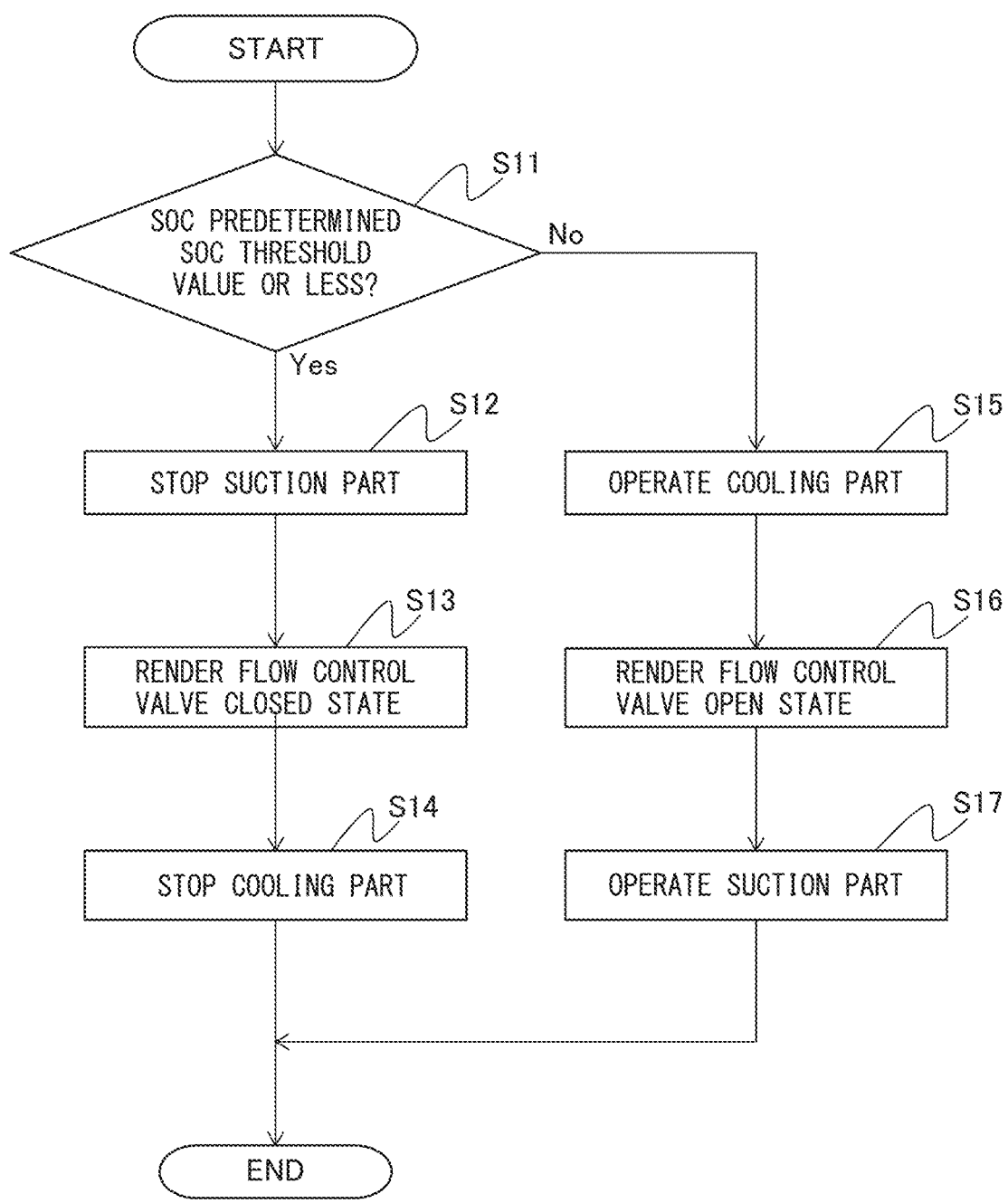
FIG. 4 is a flow chart showing a control routine performed at the $CO_2$ trapping control part.

FIG. 4 is a flow chart showing a control routine in a $CO_2$ trapping control part 32 in the present embodiment. The illustrated control routine is performed every certain time interval.

First, at step S11, it is judged if the SOC of the battery 6 is a predetermined SOC threshold value or less. As this predetermined SOC threshold value, for example, the lower limit 14% of the SOC when priority charging control is performed is used. The judgment of whether the SOC is a predetermined SOC threshold value or less is, for example, performed by the $CO_2$ trapping control part 32 based on the output value of the battery sensor 41 detecting the SOC of the battery 6. If at step S11 it is judged if the SOC of the battery 6 is a predetermined SOC threshold value or less, the present control routine proceeds to step S12.

At step S12, the suction part 25 is stopped. Due to the stopping of this suction part 25, the amount of power consumption of the battery 6 is reduced. After step S12, the present control routine proceeds to step S13.

At step S13, the flow control valve 22 is rendered a closed state. After step S13, the present control routine proceeds to step S14.

At step S14, the cooling by the cooling part 23 is stopped. As a result, the amount of power consumption of the battery 6 is reduced by the amount of stopping of the cooling part 23. After step S14, the present control routine is made to end.

On the other hand, when it is judged at step S11 that the SOC of the battery 6 is not the predetermined SOC threshold value or less, the present control routine proceeds to step S15.

At step S15, the cooling part 23 is operated. As a result, the electric power of the battery 6 is used to cool the $CO_2$ trapping part 24. After step S15, the present control routine proceeds to step S16.

At step S16, the flow control valve 22 is controlled to the open state. As a result, the exhaust gas can flow from the exhaust passage 2b into the branch passage 21. After step S16, the present control routine proceeds to step S17.

At step S17, the suction part 25 is operated. As a result, the electric power of the battery 6 is used to suck exhaust gas from the exhaust passage 2b and the sucked exhaust gas flows into the branch passage 21. At steps S15 to S17, exhaust gas flows from the exhaust passage 2b to the branch passage 21, exhaust gas cooled at the cooling part 23 flows into the $CO_2$ trapping part 24, and $CO_2$ in the exhaust gas is trapped at the $CO_2$ trapping part 24. After step S17, the present control routine is made to end.

Further, in the present embodiment, the control routine was performed in the order of stopping the suction part 25 (step S12), closing the flow control valve 22 (step S13), and stopping the cooling part 23 (step S14), but these may be simultaneously performed. Similarly, the control routine was performed in the order of operating the cooling part 23 (step S15), opening the flow control valve 22 (step S16), and operating the suction part 25 (step S17), but these may also be simultaneously performed.

Other Actions and Effects

Next, the other actions and effects exhibited by the $CO_2$ trapping device 20 having the above-mentioned such configuration will be explained.

In the present embodiment, when the SOC of the battery 6 becomes the predetermined SOC threshold value or less, the $CO_2$ trapping control part 32 stops the suction by the suction part 25 at step S12. As a result, electric power for suction by the suction part 25 is cut, so a shortage of the electric power required for driving is kept from occurring.

Further, in the present embodiment, at step S12, the suction part 25 is made to stop, then, at step S13, the flow control valve 22 is controlled to the closed state so that the flow of exhaust gas to the $CO_2$ trapping part 24 is shut off. Furthermore, in the present embodiment, at step S16, the flow control valve 22 is rendered the open state, then, at step S17, the suction part 25 is operated. Here, if the flow control valve 22 is in a closed state and the suction part 25 is operating, the branch passage 21 becomes greater in degree of negative pressure, a strong suction force ends up acting on the $CO_2$ adsorbent of the $CO_2$ trapping part 24, and the $CO_2$ adsorbed at the $CO_2$ trapping part 24 ends up desorbing from the $CO_2$ trapping part 24. By making the suction part 25 stop, then rendering the flow control valve 22 a closed state or by rendering the flow control valve 22 an open state, then operating the suction part 25 like in the present embodiment, a strong suction force is kept from acting on the $CO_2$ adsorbent of the $CO_2$ trapping part 24. As a result, the $CO_2$ adsorbed at the $CO_2$ trapping part 24 is kept from ending up desorbing from the $CO_2$ trapping part 24.

Further, in the present embodiment, at step S13, the flow control valve 22 is controlled to the closed state, then, at step S14, the cooling of the exhaust gas by the cooling part 23 is stopped. Furthermore, in the present embodiment, at step S15, the cooling part 23 is operated, then at step S16, the flow control valve 22 is rendered the open state. Here, even if the cooling part 23 stops and the flow control valve 22 is in the open state, the high temperature exhaust gas which flows through the flow control valve 22 flows into the $CO_2$ trapping part 24 as is without being cooled at the cooling part 23. For this reason, sometimes the $CO_2$ trapping part 24 becomes high in temperature and the $CO_2$ trapping ability at the $CO_2$ trapping part 24 falls. As a result, sometimes the $CO_2$ trapped at the $CO_2$ trapping part 24 ends up being desorbed from the $CO_2$ trapping part 24. By rendering the flow control valve 22 a closed state, then stopping the cooling of the exhaust gas by the cooling part 23 or operating the cooling part 23, then rendering the flow control valve 22 an open state like in the present embodiment, high temperature exhaust gas is kept from flowing into the $CO_2$ trapping part 24. For this reason, the $CO_2$ trapping ability at $CO_2$ trapping part 24 is kept from falling and in turn $CO_2$ is kept from desorbing at the $CO_2$ trapping part 24.

Second Embodiment

Next, the $CO_2$ trapping device according to the second embodiment will be explained. The configuration of the $CO_2$ trapping device according to the second embodiment is basically similar to the configuration of the $CO_2$ trapping device according to the first embodiment. Below, the parts differing from the configuration of the $CO_2$ trapping device according to the first embodiment will be focused on in the explanation.

Summary of Filter Regeneration Processing

To trap the particulate matter (PM) discharged from the internal combustion engine 2, the exhaust passage 2b of the internal combustion engine 2 is provided with a particulate filter (below, referred to as the "filter") 2d. In such a filter 2d, if the amount of deposition of PM on the filter 2d increases, the filter 2d clogs and the pressure loss of the exhaust gas at the filter 2d increases. The increase of this pressure loss ends up inviting a drop in the output of the internal combustion engine 2 and deterioration of combustion due to harder flow of the exhaust gas.

As opposed to this, in the present embodiment, the ECU 30 estimates the amount of deposition of PM on the filter 2d and, when the estimated amount of deposition of the PM becomes greater than the limit amount of deposition, performs filter regeneration processing raising the filter 2d to a high temperature to burn off the PM deposited on the filter 2d. Here, the "limit amount of deposition" means the amount beyond which, when the amount of deposition of PM on the filter 2d increases, the pressure loss of the exhaust gas at the filter 2d will increase and deterioration of the operating state of the internal combustion engine 2 etc. will end up being invited. Further, the amount of deposition of PM is, for example, estimated based on the output values of the differential pressure sensors 42 provided around the filter 2d since the greater the amount of deposition of PM on the filter 2d, the greater the pressure loss at the filter 2d.

In such filter regeneration processing, for example, the fuel is made to oxidize in reaction at the exhaust purification catalyst 2c provided at the upstream side from the filter 2d in the direction of flow of exhaust and the heat of reaction generated by the oxidation reaction is used to hold the filter 2d at the filter regeneration temperature (for example 600° C.). As a result, the PM is burned off, so the filter 2d is kept from clogging and the pressure loss of the exhaust gas at the filter 2d is kept from increasing.

On the other hand, if such a filter regeneration processing is performed, the filter 2d is held at the filter regeneration temperature, so high temperature exhaust gas flows out from the filter 2d. After that, the high temperature exhaust gas flowing out from the filter 2d flows through the branch passage 21 and flows into the cooling part 23.

However, sometimes the exhaust gas becoming high in temperature by this filter regeneration processing flows out from the cooling part 23 without being cooled down to the targeted cooling temperature at the cooling part 23 and flows into the $CO_2$ trapping part 24. As a result, due to the $CO_2$ trapping part 24 become a high temperature, the trapping ability of $CO_2$ at the $CO_2$ trapping part 24 falls and in turn the $CO_2$ trapped by the $CO_2$ trapping part 24 ends up desorbing from the $CO_2$ trapping part 24. On the other hand, if strengthening the cooling capacity of the cooling part 23, the power consumption at the cooling part 23 increases, so a shortage of the electric power required for driving more easily occurs.

Control of $CO_2$ Trapping Device During Filter Regeneration Processing and its Action and Effects Therefore, in the present embodiment, the $CO_2$ trapping control part 32 controls the flow control valve 22 so as shut off the flow of exhaust gas to the $CO_2$ trapping part 24 not only when the SOC of the battery 6 is a predetermined SOC threshold value or less but also when filter regeneration processing is being performed. As a result, even when filter regeneration processing has been performed, the exhaust gas becoming a high temperature due to the filter regeneration processing is kept from flowing to the $CO_2$ trapping part 24. For this reason, even when filter regeneration processing is performed, the trapping ability of $CO_2$ at the $CO_2$ trapping part 24 is kept from falling and in turn the $CO_2$ is kept from being desorbed.

Further, in the present embodiment, the $CO_2$ trapping control part 32 stops the cooling by the cooling part 23 not only when the SOC of the battery 6 is a predetermined SOC threshold value or less but also when filter regeneration processing is performed. Therefore, the $CO_2$ trapping control part 32 stops the cooling by the cooling part 23 and further controls the flow control valve 22 so as to shut off the flow of exhaust gas to the $CO_2$ trapping part 24 when filter regeneration processing is being performed. By stopping this cooling, the power consumption at the cooling part 23 is reduced, so a shortage of the electric power required for driving can be kept from occurring.

Flow Chart

Figure 5:
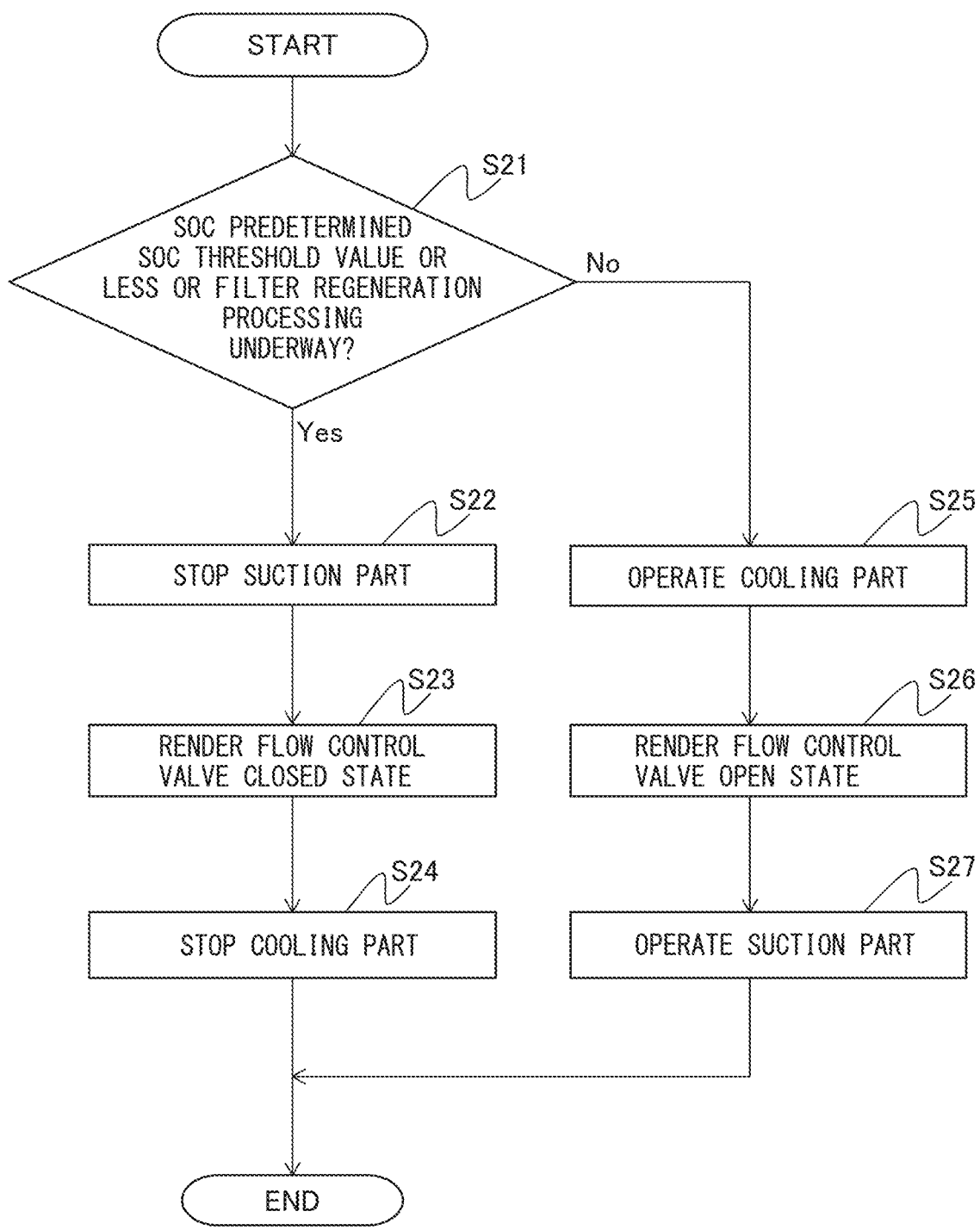
FIG. 5 is a flow chart showing a control routine performed at the $CO_2$ trapping control part.

FIG. 5 is a flow chart showing a control routine in a $CO_2$ trapping control part 32 in the present embodiment. The illustrated control routine is performed every certain time interval. Note that, steps S22 to S27 of FIG. 5 are respectively similar to steps S12 to S17 of FIG. 4, so explanations will be omitted.

At step S21, it is judged if the SOC of the battery 6 is a predetermined SOC threshold value or less or filter regeneration processing is being performed in the internal combustion engine 2. The judgment of whether filter regeneration processing is being performed at step S21 is, for example, performed based on the command value of the ECU 30. For example, the ECU 30 estimates the amount of deposition of PM on the filter 2d based on the output values of the differential pressure sensors 42 and judges if the estimated amount of deposition of PM is greater than the limit amount of deposition. Further, the ECU 30 runs a control program for performing filter regeneration processing when it is judged if the estimated amount of deposition of PM is greater than the limit amount of deposition. In this control program, the ECU 30, for example, controls the driving of a fuel injector (not shown) of the internal combustion engine 2 to inject fuel at a predetermined timing to thereby treat the unburned fuel by the exhaust purification catalyst 2c and make high temperature exhaust flow to the filter 2d and thereby burn the trapped PM. For example, it is judged whether the filter regeneration processing is being performed based on the command value which the ECU 30 outputs to a fuel injector at this time.

If at step S21 it is judged that the SOC of the battery 6 is a predetermined SOC threshold value or less or filter regeneration processing is being performed, the present control routine proceeds to step S22. On the other hand, if at step S21 it is judged that the SOC of the battery 6 is not a predetermined SOC threshold value or less and filter regeneration processing is not being performed, the present control routine proceeds to step S25.

Note that, the method for judging whether the amount of deposition of PM estimated at step S21 is greater than the limit amount of deposition is not limited to a method based on the output values of the differential pressure sensors 42. For example, it is possible to judge the estimated amount of deposition of PM is greater than the limit amount of deposition if at least one of the following is satisfied: (1) attachment of a PM sensor for detecting the amount of PM deposited on the filter 2d and an amount of PM detected by the PM sensor of a predetermined value or more, (2) elapse of a predetermined time or more from the previous filter regeneration processing, and (3) driving by a predetermined distance or more from the previous filter regeneration processing.

Further, in the present embodiment, the unburned fuel treated by the exhaust purification catalyst 2c was injected from a fuel injector, but the invention is not limited to this. For example, it is also possible to set a so-called fuel addition valve in the exhaust passage 2b to add fuel from the fuel addition valve and thereby make it flow to the exhaust purification catalyst 2c.

Other Actions and Effects

In the present embodiment, the $CO_2$ trapping control part 32 stops the suction by the suction part 25 at step S22 not only when the SOC of the battery 6 is a predetermined SOC threshold value or less but also when the internal combustion engine 2 is performing filter regeneration processing. As a result, the electric power for suction by the suction part 25 is cut, so a shortage of the electric power required for driving can be kept from occurring.

Third Embodiment

Next, the $CO_2$ trapping device according to the third embodiment will be explained. The configuration of the $CO_2$ trapping device according to the third embodiment is basically similar to the $CO_2$ trapping device according to the first embodiment. Below, the parts differing from the configuration of the $CO_2$ trapping device according to the first embodiment will be focused on in the explanation.

Summary of Operating Mode of Internal Combustion Engine

In the present embodiment, the ECU 30 switches the operating mode of the internal combustion engine 2 between the lean burn mode and the stoichiometric combustion mode. The "lean burn mode" is an operating mode targeting the air-fuel ratio set to the lean side from the stoichiometric air-fuel ratio. The "stoichiometric combustion mode" is an operating mode targeting the stoichiometric air-fuel ratio or an air-fuel ratio near it. For example, if the command value of the fuel injection amount at a fuel injector of the internal combustion engine 2 becomes a value outside of the lean burn region set based on the target rotational speed of the internal combustion engine 2 from a value inside the lean burn region, the operating mode of the internal combustion engine 2 is switched from the lean burn combustion mode to the stoichiometric combustion mode. On the other hand, if the command value of the fuel injection amount at a fuel injector of the internal combustion engine 2 becomes a value inside of the lean burn region from a value outside the lean burn region, the operating mode of the internal combustion engine 2 is switched from the stoichiometric combustion mode to the lean burn combustion mode. When switching from the lean burn mode to the stoichiometric combustion mode, for example, the intake gas supplied to a combustion chamber of the internal combustion engine 2 is decreased.

In this regard, when the air-fuel ratio is set to the lean side from the stoichiometric air-fuel ratio like with such a lean burn mode, the $CO_2$ concentration in the exhaust gas discharged from the internal combustion engine 2 becomes lower than when the air-fuel ratio is set to near the stoichiometric air-fuel ratio like with such a stoichiometric combustion mode. When driving the cooling part 23 while trapping $CO_2$ at the $CO_2$ trapping part 24 until the $CO_2$ concentration in the exhaust gas is low, the amount of $CO_2$ trapped at the $CO_2$ trapping part 24 becomes smaller for the amount of power consumption at the cooling part 23. For this reason, in this case, it is not possible to efficiently trap $CO_2$ at the $CO_2$ trapping part 24.

Control of Flow Control Valve Based on $CO_2$ Concentration in Exhaust Gas and Actions and Effects of Same Therefore, in the present embodiment, the $CO_2$ trapping control part 32 stops cooling by the cooling part 23 and controls the flow control valve 22 so as to shut off the exhaust gas to the $CO_2$ trapping part 24 not only when the SOC of the battery 6 is a predetermined SOC threshold value or less but also when the $CO_2$ concentration in the exhaust gas is a predetermined concentration threshold value or less. As a result, when the trapping efficiency of the $CO_2$ at the $CO_2$ trapping part 24 is poor, trapping of $CO_2$ at the $CO_2$ trapping part 24 is suppressed and power consumption at the cooling part 23 is reduced. For this reason, $CO_2$ is efficiently trapped at the $CO_2$ trapping part 24 and a shortage of the electric power required for driving can be kept from occurring.

Flow Chart

Figure 6:
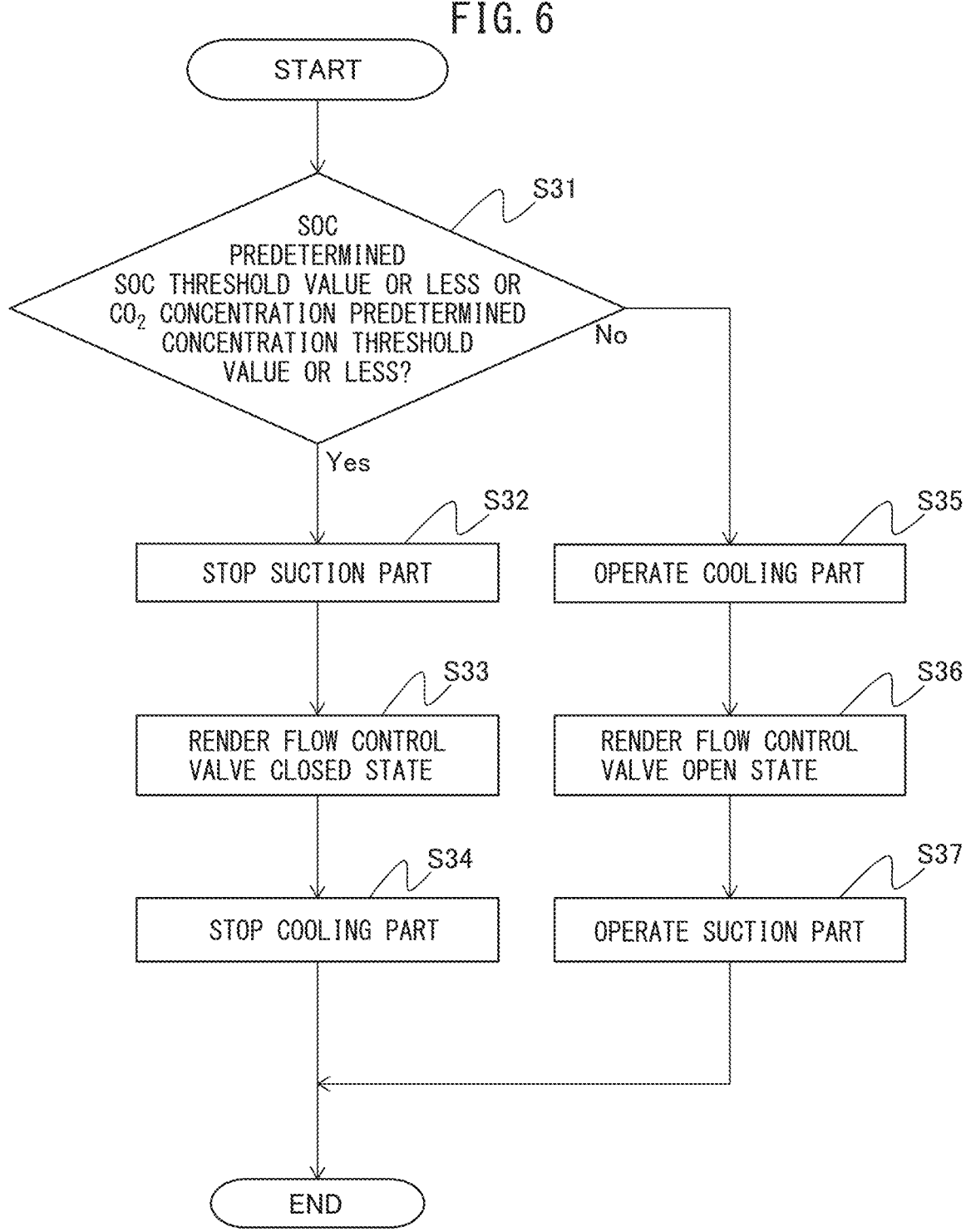
FIG. 6 is a flow chart showing a control routine performed at the $CO_2$ trapping control part.

FIG. 6 is a flow chart showing a control routine in a $CO_2$ trapping control part 32 in the present embodiment. The illustrated control routine is performed every certain time interval. Note that, steps S32 to S37 of FIG. 6 are respectively similar to steps S12 to S17 of FIG. 4, so explanations will be omitted.

At step S31, it is judged whether the SOC of the battery 6 is a predetermined SOC threshold value or less or if the $CO_2$ concentration in the exhaust gas is a predetermined concentration threshold value or less. At step S31, for example, it is judged if the $CO_2$ concentration in the exhaust gas estimated based on the output value of the air-fuel ratio sensor 43 is a predetermined concentration threshold value or less. However, the invention is not limited to this. For example, if it is judged that the internal combustion engine 2 is in the lean burn mode based on the command value of the ECU 30, it may be judged that the $CO_2$ concentration in the exhaust gas is a predetermined concentration threshold value or less.

If at step S31 it is judged that the SOC of the battery 6 is a predetermined SOC threshold value or less or the $CO_2$ concentration in the exhaust gas is a predetermined concentration threshold value or less, the present control routine proceeds to step S32. On the other hand, if, at step S31, it is judged that the SOC of the battery 6 is not the predetermined SOC threshold value or less and the $CO_2$ concentration in the exhaust gas is not a predetermined concentration threshold value or less, the present control routine proceeds to step S35.

Note that, at step S31, in addition to whether the SOC of the battery 6 is a predetermined SOC threshold value or less and whether the $CO_2$ concentration in the exhaust gas is a predetermined concentration threshold value or less, whether the internal combustion engine 2 is performing a filter regeneration processing may also be judged. In this case, if, at step S31, in addition to whether the SOC of the battery 6 is a predetermined SOC threshold value or less and whether the $CO_2$ concentration in the exhaust gas is a predetermined concentration threshold value or less being judged, whether the internal combustion engine 2 is performing a filter regeneration processing is judged, the control routine proceeds to step S32. Further, if, at step S31, it is judged that the SOC of the battery 6 is not a predetermined SOC threshold value or less and the $CO_2$ concentration in the exhaust gas not a predetermined concentration threshold value or less and the internal combustion engine 2 is not performing a filter regeneration processing, the control routine proceeds to step S35.

Further, in the present embodiment, the time of the lean burn mode was illustrated as the case where the $CO_2$ concentration in the exhaust gas is low, but the invention is not limited to this. The "case where the $CO_2$ concentration in the exhaust gas is low", for example, may include the middle of a fuel cut operation stopping the supply of fuel from the fuel injectors of the internal combustion engine 2 and other timings.

Other Actions and Effects

In the present embodiment, the $CO_2$ trapping control part 32 makes the suction by the suction part 25 at step S22 stop not only when the SOC of the battery 6 is the predetermined SOC threshold value or less but also when the $CO_2$ concentration in the exhaust gas is a predetermined concentration threshold value or less. As a result, the electric power for suction by the suction part 25 is cut, so a shortage of the electric power required for driving can be kept from occurring.

Fourth Embodiment

Next, the $CO_2$ trapping device according to the fourth embodiment will be explained. The configuration of the $CO_2$ trapping device according to the fourth embodiment is basically similar to the configuration of the $CO_2$ trapping device according to the first embodiment. Below, the parts differing from the configuration of the $CO_2$ trapping device according to the fourth embodiment will be focused on in the explanation.

Configurations of Internal Combustion Engine and $CO_2$ Trapping Device

Figure 7:
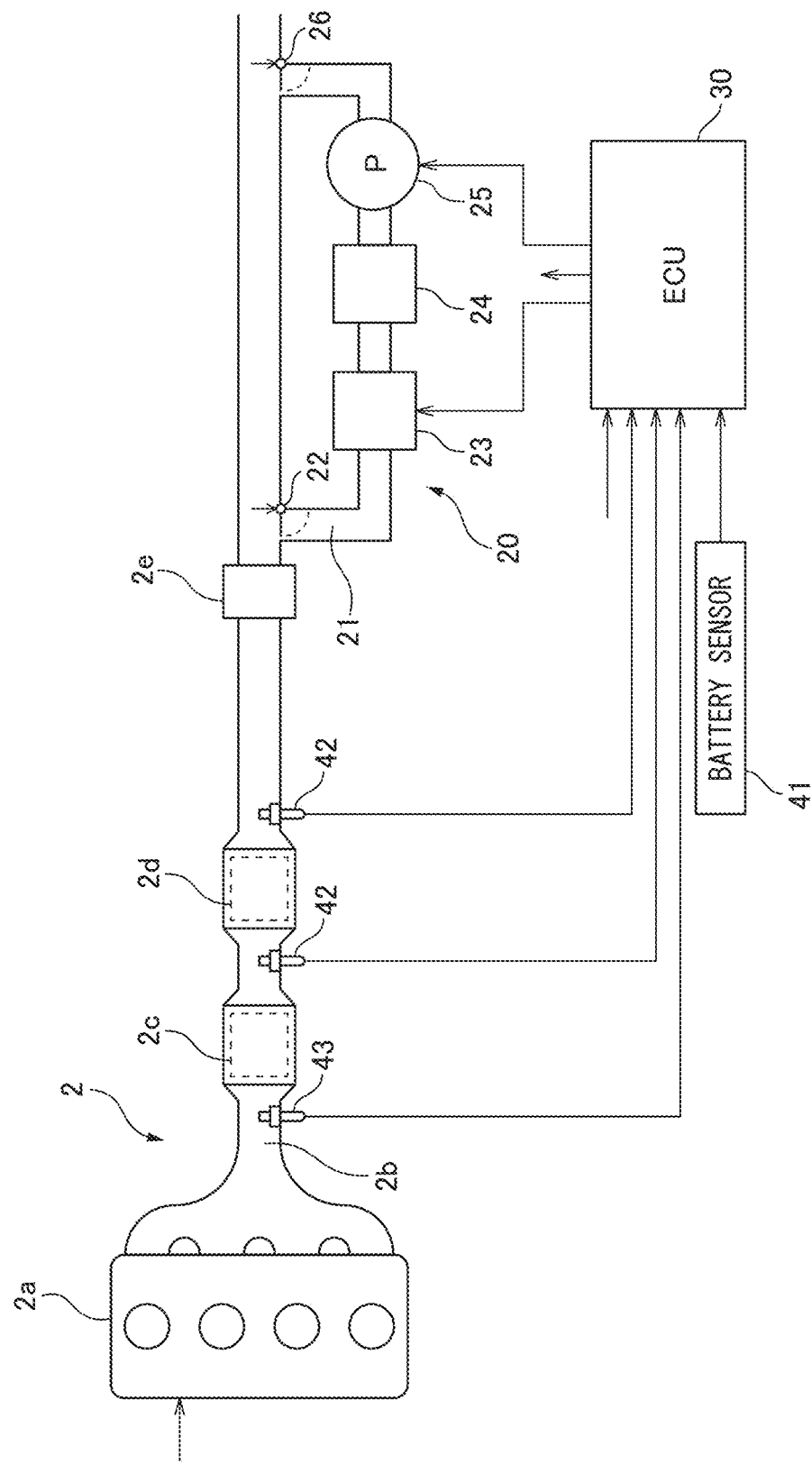
FIG. 7 is a view showing the configurations of an internal combustion engine and $CO_2$ trapping device.

FIG. 7 is a view schematically showing the configurations of the internal combustion engine 2 and $CO_2$ trapping device 20 according to the present embodiment. As shown in FIG. 7, the $CO_2$ trapping device 20 is provided with a shutoff valve 26 in addition to the components in the first embodiment and the branch passage 21 is connected to be able to merge with the exhaust passage 2b at the downstream side from the $CO_2$ trapping part 24 in the direction of flow of exhaust gas. That is, in the present embodiment, the exhaust gas flowing through the branch passage 21 merges with the exhaust passage 2b and is discharged to the atmosphere through the exhaust passage 2b.

The shutoff valve 26 is provided at the end part of the branch passage 21 at the downstream side in the direction of flow of exhaust gas, that is, at the merged position of the exhaust passage 2b and the branch passage 21. In the present embodiment, the shutoff valve 26 is switched by the $CO_2$ trapping control part 32 between the open state and the closed state.

In this regard, in the present embodiment, the branch passage 21 is connected to merge with the exhaust passage 2b at the downstream side from the $CO_2$ trapping part 24 in the direction of flow of exhaust gas. For this reason, when the SOC of the battery 6 is a predetermined SOC threshold value or less, even if the flow control valve 22 is controlled to the closed state, sometimes high temperature exhaust gas flows back from the merged position of the exhaust passage 2b and the branch passage 21 and ends up flowing into the $CO_2$ trapping part 24. As a result, sometimes the trapping ability of $CO_2$ at the $CO_2$ trapping part 24 falls and in turn $CO_2$ ends up being desorbed from the $CO_2$ trapping part 24.

Therefore, in the present embodiment, the $CO_2$ trapping control part 32 controls the shutoff valve 26 to the closed state when the SOC of the battery 6 is the predetermined SOC threshold value or less. As a result, the high temperature exhaust gas is kept from flowing from the above merging position side to the $CO_2$ trapping part 24. For this reason, the trapping ability of $CO_2$ at the $CO_2$ trapping part 24 is kept from falling and in turn the $CO_2$ at the $CO_2$ trapping part 24 is kept from being desorbed.

Flow Chart

FIG. 8 is a flow chart showing a control routine in a $CO_2$ trapping control part 32 in the present embodiment. The illustrated control routine is performed every certain time interval. Note that, steps S41, S42, S44, S45, and S47 of FIG. 8 are respectively similar to step S11, S12, S14 S15, and S17 of FIG. 4, so explanations will be omitted.

At step S43, the flow control valve 22 and shutoff valve 26 are controlled to the closed state. As a result, the flow of exhaust gas from the branched position branching from the exhaust passage 2b to the branch passage 21 to the branch passage 21 is shut off and the flow of exhaust gas from the merging position where the branch passage 21 merges with the exhaust passage 2b to the branch passage 21 is shut off. For this reason, the exhaust gas is kept from flowing to the $CO_2$ trapping part 24 through the above branched position and the exhaust gas is kept from flowing to the $CO_2$ trapping part 24 through the merging position. After step S43, the present control routine proceeds to step S44.

On the other hand, at step S46, the flow control valve 22 and shutoff valve 26 are controlled to the open state. As a result, the exhaust gas flows through the branch passage 21 through the branched position and into the $CO_2$ trapping part 24 and the exhaust gas flows through the merging position. After step S46, the present control routine proceeds to step S47.

Note that, in the present embodiment, the flow control valve 22 is provided at the end part at the branch passage 21 at the upstream side in the direction of flow of exhaust, but the invention is not limited to this. It is sufficient that it be provided at the branch passage 21 at the upstream side from the $CO_2$ trapping part 24 in the direction of flow of exhaust.

Fifth Embodiment

Next, a $CO_2$ trapping device according to a fifth embodiment will be explained. FIG. 9 is a flow chart showing a control routine in a $CO_2$ trapping control part 32 in the present embodiment. Note that, steps S52 to S57 of FIG. 9 are respectively similar to steps S12 to S17 of FIG. 4, so explanations will be omitted.

At step S51, it is judged if filter regeneration processing is being performed in the internal combustion engine 2. The method for judging at step S51 if the filter regeneration processing is being performed is similar to the method of judgment at step S21 of FIG. 5. If at step S51 it is judged that the filter regeneration processing is being performed, the present control routine proceeds to step S52. On the other hand, if at step S51 it is judged that the filter regeneration processing is not being performed, the present control routine proceeds to step S55.

Sixth Embodiment

Next, a $CO_2$ trapping device according to a sixth embodiment will be explained. FIG. 10 is a flow chart showing a control routine in a $CO_2$ trapping control part 32 in the present embodiment. Note that, steps S62 to S67 of FIG. 10 are respectively similar to steps S12 to S17 of FIG. 4, so explanations will be omitted.

At step S61, it is judged if a $CO_2$ concentration in the exhaust gas is a predetermined concentration threshold value or less. The method for judging at step S61 if the $CO_2$ concentration in the exhaust gas is a predetermined concentration threshold value or less is similar to the method of judgment at step S31 of FIG. 6. If at step S61 it is judged that the $CO_2$ concentration in the exhaust gas is a predetermined concentration threshold value or less, the present control routine proceeds to step S62 On the other hand, if at step S61 it is judged that the $CO_2$ concentration in the exhaust gas is not a predetermined concentration threshold value or less, the present control routine proceeds to step S62.

Others

Above, preferred embodiments according to the present disclosure were explained, but the present disclosure is not limited to these embodiments. Various corrections and changes can be made within the language of the claims.

For example, a moisture adsorbing part may be provided at the upstream side from the $CO_2$ trapping part 24 in the direction of flow of exhaust in accordance with the material of the $CO_2$ adsorbent used at the $CO_2$ trapping part 24. Here, the exhaust gas includes not only NOx, HC, CO, $CO_2$, etc., but also water vapor ($H_2O$). Further, the amount of $CO_2$ trapped in the zeolite used as a $CO_2$ adsorbent of the $CO_2$ trapping part 24 falls in the case causing contact with gas containing water vapor ($H_2O$). For this reason, by providing a moisture adsorbing part in front of the $CO_2$ trapping part 24, the amount of $CO_2$ trapped by the $CO_2$ adsorbent of the $CO_2$ trapping part 24 is kept from falling.

The invention claimed is:

1. A carbon dioxide (CO2) trapping device mounted in a hybrid vehicle, the hybrid vehicle comprising:
- an internal combustion engine and electric motor as sources of power; and
- a battery supplying electric power to the electric motor and able to be charged by output of the internal combustion engine, wherein the $CO_2$ trapping device comprises;
- a branch passage branched from an exhaust passage through which exhaust gas discharged from the internal combustion engine is made to flow;
- a $CO_2$ trapping part provided at the branch passage and trapping $CO_2$ in inflowing exhaust gas;
- a cooling part using electric power of the battery to cool the $CO_2$ trapping part;
- a flow controlling part controlling an amount of flow of the exhaust gas flowing into the branch passage; and
- a $CO_2$ trapping control part configured so as to control the cooling part and the flow controlling part, and the $CO_2$ trapping control part is configured to control the flow controlling part so as to make the cooling part stop cooling and to shut off the flow of the exhaust gas to the $CO_2$ trapping part when a charging rate of the battery becomes less than or equal to a predetermined state of charge (SOC) threshold value.

2. The $CO_2$ trapping device according to claim 1, wherein the internal combustion engine comprises a particulate filter provided at an upstream side from the $CO_2$ trapping device in a direction of flow of exhaust gas in the exhaust passage and trapping particulate matter in the exhaust gas, and the $CO_2$ trapping control part is further configured to control the flow controlling part so as to make the cooling part stop cooling and to shut off the flow of the exhaust gas to the $CO_2$ trapping part when filter regeneration processing is performed holding a temperature of the particulate filter at a filter regeneration temperature.

3. The $CO_2$ trapping device according to claim 1, wherein the $CO_2$ trapping control part is further configured to control the flow controlling part so as to make the cooling part stop cooling and to shut off the flow of the exhaust gas to the $CO_2$ trapping part when a concentration of $CO_2$ in the exhaust gas is less than or equal to a predetermined concentration threshold value.

4. The $CO_2$ trapping device according to claim 1, wherein the branch passage is connected so as to merge with the exhaust passage at a downstream side from the $CO_2$ trapping part in a direction of flow of exhaust gas, the $CO_2$ trapping device further includes a shutoff valve provided in the branch passage between a merging position with the exhaust passage and the $CO_2$ trapping part, and the $CO_2$ trapping control part is further configured to control the shutoff valve so as to render the shutoff valve a closed state when the charging rate of the battery becomes less than or equal to the predetermined SOC threshold value.

5. The $CO_2$ trapping device according to claim 1, wherein the $CO_2$ trapping control part is further configured to control the flow controlling part so as to shut off the flow of the exhaust gas to the $CO_2$ trapping part, and configured to then stop cooling by the cooling part.

6. The $CO_2$ trapping device according to claim 1, wherein the $CO_2$ trapping device comprises a suction part using electric power of the battery to suck in the exhaust gas from the exhaust passage and making the sucked in exhaust gas flow into the branch passage, and the $CO_2$ trapping control part is further configured to make suction by the suction part stop when the charging rate of the battery becomes less than or equal to the predetermined SOC threshold value.

7. The $CO_2$ trapping device according to claim 6, wherein the $CO_2$ trapping control part is configured to control the flow controlling part so as to stop the suction part, then shut off the flow of the exhaust gas to the $CO_2$ trapping part.

* * * * *